UNITED STATES PATENT OFFICE.

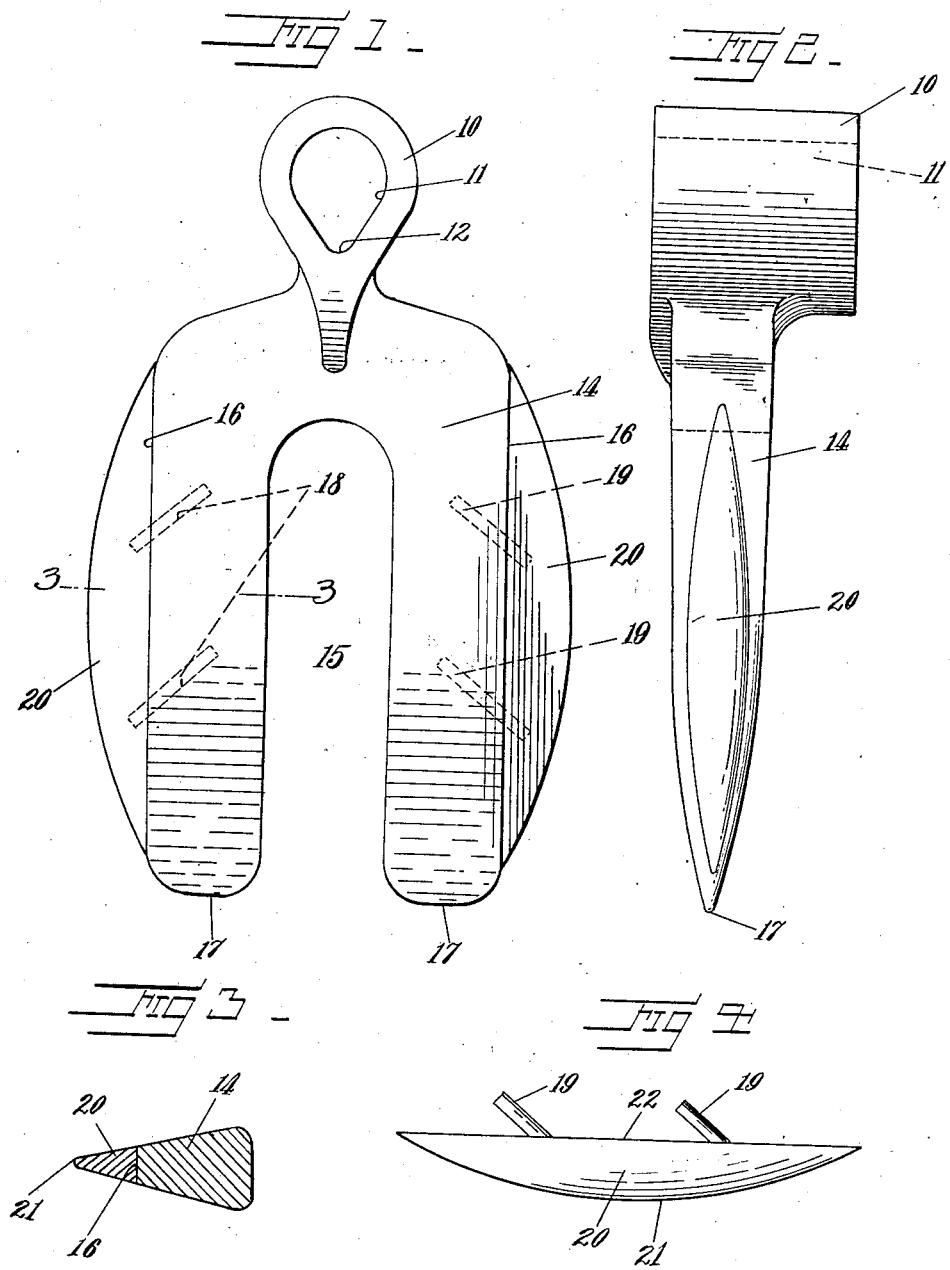

JOZEF ZIP, OF SNOW, NORTH DAKOTA.

COMBINED RAKE AND HOE.

1,329,102.

Specification of Letters Patent.  Patented Jan. 27, 1920.

Application filed March 4, 1919. Serial No. 280,534.

*To all whom it may concern:*

Be it known that I, JOZEF ZIP, a citizen of the United States, residing at Snow, county of Billings, and State of North Dakota, have invented certain new and useful Improvements in Combined Rakes and Hoes, of which the following is a specification.

This invention relates to improvements in agricultural implements, and particularly to those used in manually tilling the soil, such as hoes and rakes.

The principal object of the invention is to provide in a single implement the combination of a hoe and rake, which may be used for either purpose in an efficient and convenient manner.

This object is accomplished by the novel construction and combination of parts hereinafter described, and shown in the accompanying drawing, forming a material part of this disclosure, and in which:—

Figure 1 is a plan view, showing a combined implement made in accordance with the invention.

Fig. 2 is a side elevational view of the same.

Fig. 3 is a transverse sectional view taken on line 3—3 of Fig. 1, and,

Fig. 4 is a side elevational view, showing the hoe attachment in detail.

The implement is composed of an elongated hub 10, containing an eye 11, the lower portion 12 of which is elliptical and suited to receive a wooden handle bar of conventional type, which being fitted to the eye may be contained therein, due to its irregular shape.

Formed integrally with the hub 10 is a depending U shaped element, the limbs 14 of which are of substantially triangular cross section, being thicker at their inner edges, adjacent to the space 15 and tapering to a reduced edge 16, forming in effect a two tined rake adapted for the heaviest service.

The extreme lower ends 17 of the rake are brought nearly to a sharp edge, and rounded at the corners as is readily apparent from an inspection of Fig. 1.

Contained in the narrow edges 16 are round, angularly formed recesses 18 and suited to tightly engage therein are corresponding pins or projections 19, rigidly engaged in a pair of opposed hoe elements 20, which present in plan view an elongated oval having a relatively sharp outer edge 21, and a flat level inner surface 22, adapted to rest closely adjacent to the outer edge 18 of the rake tine 14.

The side edges 21 are arcuately curved, having their extreme ends so shaped as to agree with the rounded corners of the ends 17 and shoulders or upper elements of the sides 14, the arrangement being such, that, as the hoe elements 20 are engaged with the side elements 14, by the extending pins, that the same will remain in place, but can be removed therefrom, obviously, by pressing upon the upper portion of the hoe elements so as to loosen the pins from the openings 18.

From the foregoing, it will be seen that a serviceable implement has been disclosed, capable of being used either as a rake or with the addition of the side element 20, as a hoe in tilling the soil.

Having thus described my invention what I claim as new, and desire to secure by Letters Patent is:

1. In an implement of the type described, the combination with a hub and an eye therethrough, said eye having an elliptical cross section, of a pair of supporting elements formed with said hub and extending in parallel relation therebelow, said supporting elements having sides converging outwardly, and having a straight outer surface, a pair of elongated oval members having sharp outer edges, and means connecting said oval members with the sides of said supporting elements.

2. In an implement of the type described, the combination with a hub and an eye therethrough, said eye having an elliptical cross section, of a pair of supporting elements formed with said hub and extending in parallel relation therebelow, said supporting elements having sides converging outwardly and having a straight outer surface, a pair of elongated oval members having sharp outer edges, and pins fixed in the inner sides of said oval members, said pins being engageable in openings formed in the mentioned straight sides of said supporting elements.

In testimony whereof I have affixed my signature.

JOE ZIP.